United States Patent
Akahane et al.

(10) Patent No.: US 12,512,002 B2
(45) Date of Patent: Dec. 30, 2025

(54) TRAVEL CONTROL DEVICE, TRAVEL CONTROL METHOD, AND NON-TRANSITORY RECORDING MEDIUM

(71) Applicant: TOYOTA JIDOSHA KABUSHIKI KAISHA, Toyota (JP)

(72) Inventors: Satoru Akahane, Yokohama (JP); Terumoto Komori, Shizuoka-ken (JP); Shimpei Kokubo, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 123 days.

(21) Appl. No.: 18/595,700

(22) Filed: Mar. 5, 2024

(65) Prior Publication Data

US 2024/0304091 A1     Sep. 12, 2024

(30) Foreign Application Priority Data

Mar. 8, 2023    (JP) ................................. 2023-035757

(51) Int. Cl.
| | |
|---|---|
| *G08G 1/16* | (2006.01) |
| *B60W 40/107* | (2012.01) |
| *B60W 60/00* | (2020.01) |
| *G06V 20/56* | (2022.01) |

(52) U.S. Cl.
CPC ........... *G08G 1/167* (2013.01); *B60W 40/107* (2013.01); *B60W 60/001* (2020.02); *G06V 20/56* (2022.01); *B60W 2420/403* (2013.01); *B60W 2554/801* (2020.02); *B60W 2720/10* (2013.01)

(58) Field of Classification Search
CPC ..... B60W 2420/403; B60W 2554/801; B60W 2554/804; B60W 2720/10; B60W 40/107; B60W 60/001; B60W 60/0015; B60W 60/0016; B60W 60/0017; G06V 20/56; G08G 1/166; G08G 1/167
See application file for complete search history.

(56) References Cited

U.S. PATENT DOCUMENTS

| | | | |
|---|---|---|---|
| 11,279,362 B2 * | 3/2022 | Kuwahara | .......... B60W 60/0011 |
| 2005/0012604 A1 * | 1/2005 | Takahashi | .............. G08G 1/166 340/435 |

(Continued)

FOREIGN PATENT DOCUMENTS

| | | | | |
|---|---|---|---|---|
| CN | 114643996 A | * | 6/2022 | ............ B60W 10/04 |
| JP | 2003-237407 A | | 8/2003 | |

(Continued)

*Primary Examiner* — Babar Sarwar
(74) *Attorney, Agent, or Firm* — Dinsmore & Shohl LLP (57) ABSTRACT

A travel control device performs blind area avoidance control when a host vehicle is in a blind area, a relative speed which is a value obtained by subtracting a speed of the host vehicle from a speed of an adjacent vehicle is larger than a first relative speed threshold value, the relative speed is smaller than a second relative speed threshold value, and an elapsed time from the point of time the host vehicle entered the blind area is an elapsed time threshold value or more and does not perform the blind area avoidance control when the host vehicle is not in the blind area, when the relative speed is the first relative speed threshold value or less, when the relative speed is the second relative speed threshold value or more, or when the elapsed time is shorter than the elapsed time threshold value.

6 Claims, 5 Drawing Sheets

(56) References Cited

U.S. PATENT DOCUMENTS

| | | | |
|---|---|---|---|
| 2005/0275514 A1* | 12/2005 | Roberts | B60Q 5/00 340/436 |
| 2006/0025918 A1* | 2/2006 | Saeki | B60W 10/06 701/96 |
| 2012/0296522 A1* | 11/2012 | Otuka | B60W 30/12 701/41 |
| 2016/0311464 A1* | 10/2016 | Yamaoka | B62D 15/0255 |
| 2018/0354510 A1* | 12/2018 | Miyata | B60W 30/18163 |
| 2019/0118811 A1* | 4/2019 | Watanabe | B60K 31/0008 |
| 2019/0359218 A1* | 11/2019 | Pohl | B60W 30/0956 |
| 2021/0016791 A1* | 1/2021 | Elkins | B60W 50/16 |
| 2022/0348227 A1* | 11/2022 | Foster | B60Q 1/507 |
| 2023/0306850 A1* | 9/2023 | Szczerba | G06F 3/011 |

FOREIGN PATENT DOCUMENTS

| | | |
|---|---|---|
| JP | 2009-211309 A | 9/2009 |
| JP | 2019-073241 A | 5/2019 |
| JP | 2022-147629 A | 10/2022 |

\* cited by examiner

TRAVEL CONTROL DEVICE, TRAVEL CONTROL METHOD, AND NON-TRANSITORY RECORDING MEDIUM

CROSS-REFERENCE TO RELATED APPLICATIONS

This application claims priority to Japanese Patent Application No. 2023-035757 filed Mar. 8, 2023, the entire contents of which are herein incorporated by reference.

FIELD

The present disclosure relates to a travel control device, a travel control method, and a non-transitory recording medium.

BACKGROUND

PTL 1 (Japanese Unexamined Patent Publication No. 2003-237407) describes technology in which when an object is continuously detected at a side of a traveling host vehicle, it is estimated that the object is another vehicle traveling parallel with the host vehicle and that the possibility is high of the host vehicle being continuously positioned in a blind area of the vehicle and a speed of the host vehicle is controlled so that an absolute value of the relative speed of the vehicle and the host vehicle becomes larger.

In the art described in PTL 1, when an adjacent vehicle (another vehicle) is detected in the front of and to the side of the host vehicle, the time period when the adjacent vehicle is continuously detected is measured and, when the time period exceeds a predetermined threshold value, control is performed to change the target speed of the host vehicle to smaller than a standard speed.

As explained above, in the art described in PTL 1, control for changing the speed of the host vehicle (blind area avoidance control for making the host vehicle avoid traveling in a blind area of the adjacent vehicle) is not performed until the time period when the adjacent vehicle is continuously detected exceeds a predetermined threshold value. In other words, in the art described in PTL 1, it is not possible to determine whether to perform blind area avoidance control until the time period when an adjacent vehicle is continuously detected exceeds a predetermined threshold value and it is not possible to determine early that there is no need to perform blind area avoidance control.

On the other hand, sometimes determining early that there is no need to perform blind area avoidance control is sought.

SUMMARY

In view of the above points, the present disclosure has as its object the provision of a travel control device, a travel control method, and a non-transitory recording medium able to determine early that there is no need to perform blind area avoidance control making a host vehicle avoid traveling in a blind area of an adjacent vehicle.

(1) One aspect of the present disclosure is a travel control device including a processor configured to: acquire nearby vehicle information and surrounding road environment information of a host vehicle; and perform blind area avoidance control making the host vehicle avoid traveling in a blind area of an adjacent vehicle which is traveling in a lane adjoining a lane in which the host vehicle is traveling based on the nearby vehicle information, wherein the processor performs the blind area avoidance control when the host vehicle is positioned in the blind area, a relative speed which is a value obtained by subtracting a speed of the host vehicle from a speed of the adjacent vehicle is larger than a first relative speed threshold value, the relative speed is smaller than a second relative speed threshold value, and an elapsed time from the point of time when the host vehicle entered the blind area is an elapsed time threshold value or more, and does not perform the blind area avoidance control when the host vehicle is not positioned in the blind area, when the relative speed is the first relative speed threshold value or less, when the relative speed is the second relative speed threshold value or more, or when the elapsed time is shorter than the elapsed time threshold value.

(2) In the travel control device of the aspect (1), the processor may determine whether to perform the blind area avoidance control and calculate a degree of acceleration and deceleration of the host vehicle for performing the blind area avoidance control.

(3) In the travel control device of the aspect (1), the processor may be configured to determine that the host vehicle is positioned in the blind area when a front end of the host vehicle is positioned in a determination area between a position a predetermined amount behind a rear end of the adjacent vehicle and a position a predetermined amount ahead of the rear end of the adjacent vehicle in a lane in which the host vehicle is traveling.

(4) In the travel control device of the aspect (1), the nearby vehicle information may include data of an image of the front of the host vehicle captured by a front camera installed in the host vehicle, and the processor may be configured to determine that the host vehicle is not in the blind area when the image of the front of the host vehicle contains the adjacent vehicle, and determine that the host vehicle is in the blind area when the image of the front of the host vehicle does not contain the adjacent vehicle.

(5) Another aspect of the present disclosure is a travel control method including: acquiring nearby vehicle information and surrounding road environment information of a host vehicle; and performing blind area avoidance control making the host vehicle avoid traveling in a blind area of an adjacent vehicle which is traveling in a lane adjoining a lane in which the host vehicle is traveling based on the nearby vehicle information, wherein the blind area avoidance control is performed when the host vehicle is positioned in the blind area, a relative speed which is a value obtained by subtracting a speed of the host vehicle from a speed of the adjacent vehicle is larger than a first relative speed threshold value, the relative speed is smaller than a second relative speed threshold value, and an elapsed time from the point of time when the host vehicle entered the blind area is an elapsed time threshold value or more, and the blind area avoidance control is not performed when the host vehicle is not positioned in the blind area, when the relative speed is the first relative speed threshold value or less, when the relative speed is the second relative speed threshold value or more, or when the elapsed time is shorter than the elapsed time threshold value.

(6) Another aspect of the present disclosure is a non-transitory recording medium having recorded thereon a computer program for causing a processor to execute a process including: acquiring nearby vehicle information and surrounding road environment information of a host vehicle; and performing blind area avoidance control making the host vehicle avoid traveling in a blind area of an adjacent vehicle which is traveling in a lane adjoining a lane in which the host vehicle is traveling based on the nearby vehicle information, wherein the blind area avoidance control is performed when the host vehicle is positioned in the blind area, a relative speed which is a value obtained by subtracting a speed of the host vehicle from a speed of the adjacent vehicle is larger than a first relative speed threshold value, the relative speed is smaller than a second relative speed threshold value, and an elapsed time from the point of time when the host vehicle entered the blind area is an elapsed time threshold value or more, and the blind area avoidance control is not performed when the host vehicle is not positioned in the blind area, when the relative speed is the first relative speed threshold value or less, when the relative speed is the second relative speed threshold value or more, or when the elapsed time is shorter than the elapsed time threshold value.

According to the present disclosure, it is possible to determine early that there is no need to perform blind area avoidance control for making a host vehicle avoid traveling in a blind area of an adjacent vehicle.

DESCRIPTION OF EMBODIMENTS

Below, referring to the drawings, embodiments of a travel control device, a travel control method, and a non-transitory recording medium of the present disclosure will be explained.

First Embodiment

Figure 1:
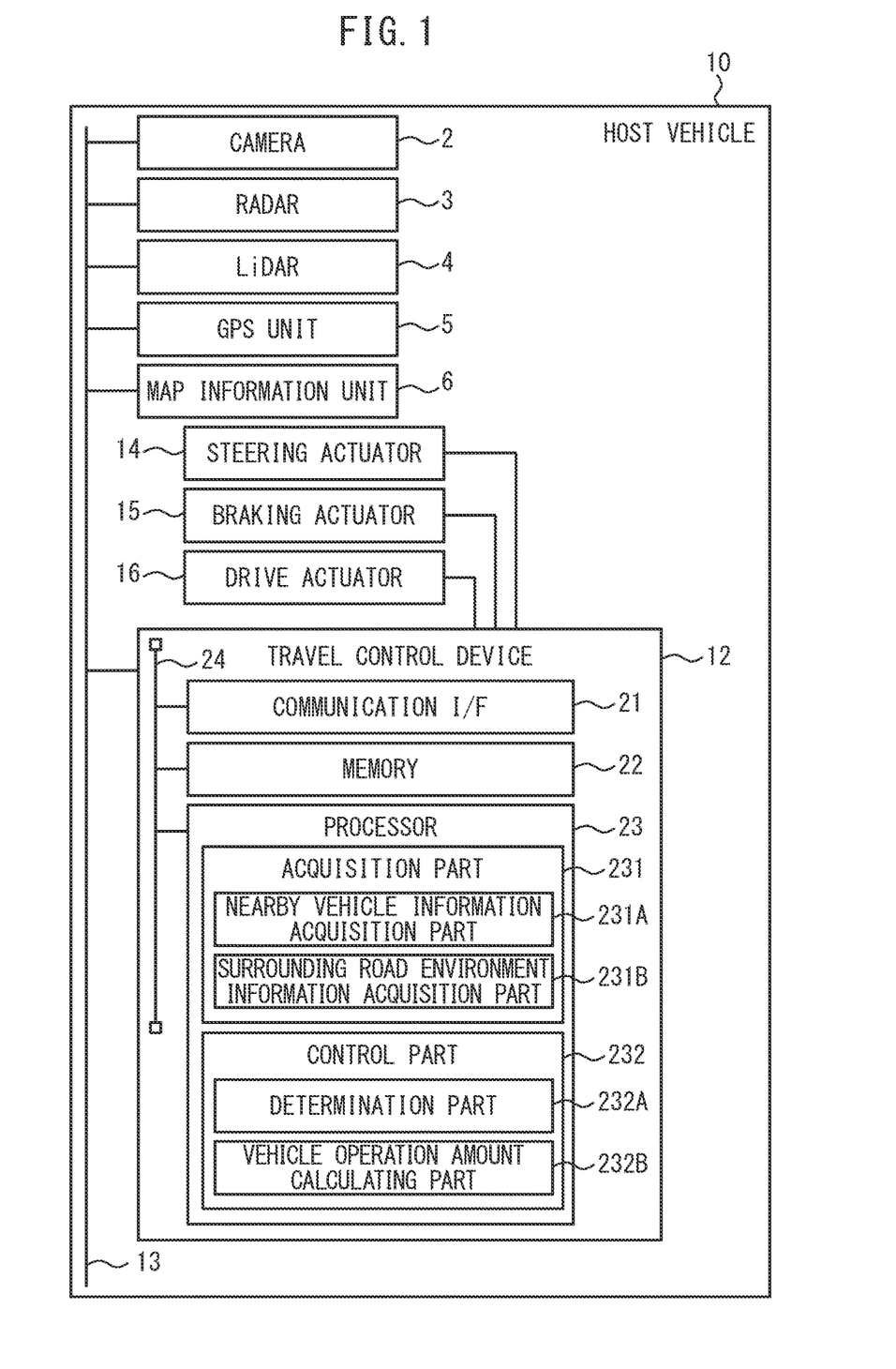
FIG. 1 is a view showing one example of the schematic configuration of a host vehicle 10 to which a travel control device 12 of a first embodiment is applied.

FIG. 1 is a view showing one example of the schematic configuration of a host vehicle 10 to which a travel control device 12 of a first embodiment is applied.

In the example shown in FIG. 1, the host vehicle 10 is provided with camera 2, radar 3, LiDAR (light detection and ranging) device 4, and the travel control device 12. The camera 2 captures images of a nearby vehicle of the host vehicle 10 (other vehicle present in the vicinity of the host vehicle 10) and the road environment in the vicinity of the host vehicle 10 (for example, the road structure, rules, etc.) and generates and sends to the travel control device 12 image data showing the nearby vehicle and road environment of the vicinity. The radar 3 is, for example, a millimeter wave radar, 24 GHz band narrow band region radar, etc., detects a relative position and a relative speed of the nearby vehicle and the road structure in the vicinity with respect to the host vehicle 10, and sends the result of detection to the travel control device 12. The LiDAR 4 detects the relative position and relative speed of the nearby vehicle and the road structure in the vicinity with respect to the host vehicle 10 and sends the result of detection to the travel control device 12.

In another example, the host vehicle 10 may also be provided with a sonar (not shown). In this example, the sonar detects the relative position and relative speed of the nearby vehicle and the road structure in the vicinity with respect to the host vehicle 10 and sends the result of detection to the travel control device 12.

In the example shown in FIG. 1, the host vehicle 10 is provided with a GPS (global positioning system) unit 5 and a map information unit 6. The GPS unit 5 acquires positional information showing the current position of the host vehicle 10 based on the GPS signal and sends the positional information of the host vehicle 10 to the travel control device 12. The map information unit 6 is, for example, formed in an HDD (hard disk drive), SSD (solid state drive), or the like mounted in the host vehicle 10. The map information held by the map information unit 6 includes the road structure (position of the road, shape of the road, lane structure, etc.), rules, and various other types of information. The camera 2, radar 3, LiDAR 4, GPS unit 5, map information unit 6, and travel control device 12 are connected through an internal vehicle network 13.

Further, the host vehicle 10 is provided with a steering actuator 14, braking actuator 15, and drive actuator 16. The steering actuator 14 has the function of steering the host vehicle 10. The steering actuator 14 includes, for example, a power steering system, steer-by-wire steering system, rear wheel steering system, etc. The braking actuator 15 has the function of making the host vehicle 10 decelerate. The braking actuator 15 includes, for example, a hydraulic brake, electric power regeneration brake, etc. The drive actuator 16 has the function of making the host vehicle 10 accelerate. The drive actuator 16, for example, includes an engine, EV (electric vehicle) system, hybrid system, fuel cell system, etc.

In the example shown in FIG. 1, the travel control device 12 is configured by an autonomous control ECU (electronic control unit). The travel control device 12 (autonomous control ECU) can control the host vehicle 10 by a driving control level of level 3 according to the definition of the SAE (Society of Automotive Engineers), in other words, a driving control level at which an operation of the steering actuator 14, the braking actuator 15, and the drive actuator 16 by the driver and a monitoring of surroundings of the host vehicle 10 by the driver are not necessary. Furthermore, the travel control device 12 can control the host vehicle 10 by a driving control level at which the driver is involved in the driving of the host vehicle 10, for example, a driving control level of levels 0 to 2 according to the definition of the SAE.

The travel control device 12 is comprised of a microcomputer having a communication interface (I/F) 21, memory 22, and processor 23. The communication interface 21, memory 22, and processor 23 are connected via signal lines 24. The communication interface 21 has an interface circuit for connecting the travel control device 12 to the internal vehicle network 13. The memory 22 is one example of the storage part and, for example, has a volatile semiconductor memory and nonvolatile semiconductor memory. The memory 22 stores a program used in the processing performed by the processor 23 and various types of data. Further, the memory 22 stores the result of detection of the adjacent vehicle by the camera 2, radar 3, LiDAR 4, etc. (for example, the adjacent vehicle traveling in a lane adjoining a lane in which the host vehicle 10 is traveling etc.) The processor 23 has the function of performing blind area avoidance control making the host vehicle 10 avoid traveling in the blind area of the adjacent vehicle (in more detail, the blind area of the driver of the adjacent vehicle).

In the example shown in FIG. 1, the travel control device 12 is provided with a single processor 23, but in another example, the travel control device 12 may also be provided with a plurality of processors. Further, in the example shown in FIG. 1, the travel control device 12 (autonomous control ECU) is comprised of a single ECU, but in another example, the travel control device 12 may be comprised of a plurality of ECUs.

In the example shown in FIG. 1, the processor 23 is provided with an acquisition part 231 and control part 232. The acquisition part 231 is provided with a nearby vehicle information acquisition part 231A and a surrounding road environment information acquisition part 231B.

The nearby vehicle information acquisition part 231A acquires nearby vehicle information which is information showing the position, speed, etc. of the nearby vehicle of the host vehicle 10. Specifically, the nearby vehicle information acquisition part 231A has the function of recognizing the position (in more detail, the relative position of the nearby vehicle with respect to the host vehicle 10), speed (in more detail, the relative speed of the nearby vehicle with respect to the host vehicle 10), etc. of the nearby vehicle based on image data showing the nearby vehicle sent from the cameras 2. Further, the nearby vehicle information acquisition part 231A has the function of recognizing the position, speed, etc. of the nearby vehicle based on the result of detection of the relative position and relative speed of the nearby vehicle with respect to the host vehicle 10 sent from the radar 3. Furthermore, the nearby vehicle information acquisition part 231A has the function of recognizing the position, speed, etc. of the nearby vehicle based on the result of detection of the relative position and relative speed of the nearby vehicle with respect to the host vehicle 10 sent from the LiDAR 4.

In another example, the nearby vehicle information acquisition part 231A may have the function of recognizing the position, speed, etc. of the nearby vehicle based on the result of detection of the relative position and relative speed of the nearby vehicle with respect to the host vehicle 10 sent from the sonar.

In the example shown in FIG. 1, the surrounding road environment information acquisition part 231B acquires surrounding road environment information which is information showing the road structure, rules, etc. of the vicinity of the host vehicle 10. Specifically, the surrounding road environment information acquisition part 231B has the function of recognizing the road structure, rules, etc. of the vicinity of the host vehicle 10 based on image data showing the road environment (road structure, rules, etc.) of the vicinity of the host vehicle 10 sent from the camera 2. Further, the surrounding road environment information acquisition part 231B has the function of recognizing the road structure, rules, etc. of the vicinity of the host vehicle 10 based on map information sent from the map information unit 6.

In other words, the acquisition part 231 has the function of recognizing objects (nearby vehicles and surrounding road environment) present in the vicinity of the host vehicle 10. The object recognition may be performed based on information of any of the camera 2, radar 3, LiDAR 4, GPS unit 5, and map information unit 6. The object recognition may also be performed by sensor fusion of a combination of several of these as well. In object recognition, the type of the object, for example, whether the object is a moving object or a stationary object, is determined. In case of the moving object, its position and speed are calculated. The position and speed of the moving object are, for example, calculated in a reference coordinate system centered about the host vehicle 10 and having the width direction of the host vehicle 10 as the abscissa and the advancing direction as the ordinate.

In the example shown in FIG. 1, the acquisition part 231 has a nearby vehicle detection function of detecting the nearby vehicle to be monitored from objects recognized by the object recognition function. When the adjacent vehicle is traveling in a lane adjoining a lane in which the host vehicle 10 is traveling and the host vehicle 10 is traveling in a blind area of the adjacent vehicle, the adjacent vehicle is detected as the nearby vehicle to be monitored by that nearby vehicle detection function. Specifically, when the host vehicle 10 is for example continuing to travel for greater than or equal to a predetermined time period in the blind area of the adjacent vehicle, the adjacent vehicle is detected as the nearby vehicle to be monitored by that nearby vehicle detection function.

The control part 232 performs control of the steering actuator 14, braking actuator 15, drive actuator 16, etc. based on the information acquired by the acquisition part 231.

The control part 232 has a function of performing blind area avoidance control making the host vehicle 10 avoid traveling in the blind area of the adjacent vehicle based on the nearby vehicle information acquired by the nearby vehicle information acquisition part 231A.

As the blind area avoidance control for making the host vehicle 10 avoid traveling in the blind area of the adjacent vehicle as a nearby vehicle to be monitored, the control part 232 can perform, for example, control for making the braking actuator 15 operate for making the host vehicle 10 decelerate, control for making the drive actuator 16 operate for making the host vehicle 10 accelerate, etc.

The control part 232 is provided with a determination part 232A and a vehicle operation amount calculating part 232B. The determination part 232A performs determination as to whether to the perform blind area avoidance control for making the host vehicle 10 avoid traveling in the blind area of the adjacent vehicle.

The vehicle operation amount calculating part 232B has a function of processing operation amount of the steering actuator 14, the braking actuator 15, the drive actuator 16, etc. of the host vehicle 10. Specifically, the vehicle operation amount calculating part 232B has at least the function of calculating the degree of acceleration and deceleration of the host vehicle 10 for performing the blind area avoidance control. In other words, when the determination part 232A determines to perform the blind area avoidance control, the vehicle operation amount calculating part 232B calculates the degree of acceleration and deceleration of the host vehicle 10 for performing the blind area avoidance control.

Figure 2:
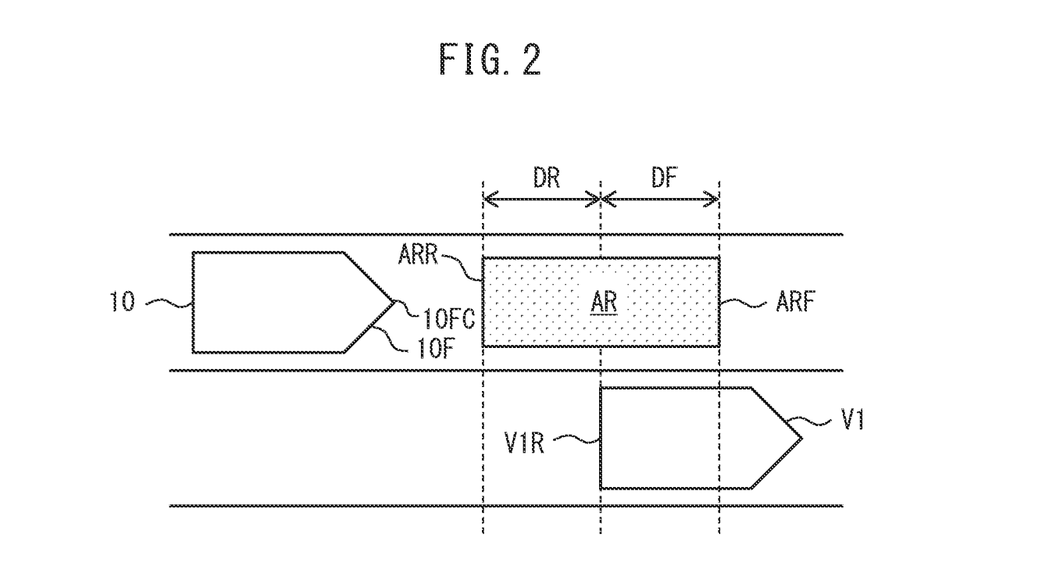
FIG. 2 is a view for explaining one example of a determination area AR used for determination of whether to perform blind area avoidance control.

FIG. 2 is a view for explaining one example of a determination area AR used for determination of whether to perform the blind area avoidance control. In more detail, FIG. 2 shows the determination area AR used for determining whether the host vehicle 10 is positioned in the blind area BA (see FIG. 3A and FIG. 3B) of the adjacent vehicle V1.

In the example shown in FIG. 2, the determination area AR is set between a determination area rear end ARR which is a position a predetermined amount DR (for example 2 m) behind (left side of FIG. 2) a rear end VIR of the adjacent vehicle V1 and a determination area front end ARF which is a position a predetermined amount DF (for example 2 m) ahead (right side of FIG. 2) of the rear end VIR of the adjacent vehicle V1 in the lane in which the host vehicle 10 is traveling. The control part 232 determines that the host vehicle 10 is positioned in the blind area BA of the adjacent vehicle V1 when a front end 10F of the host vehicle 10 (in more detail, front end center 10FC of host vehicle 10) is positioned in the determination area AR.

Figure 3A:
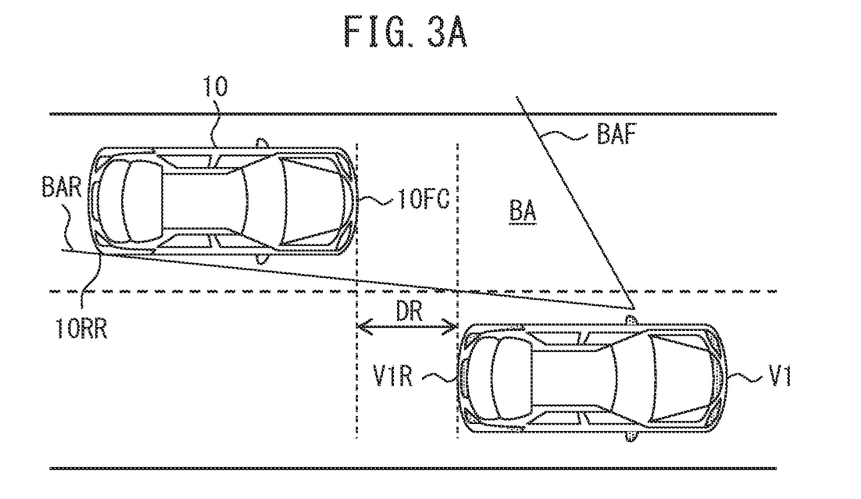
FIG. 3A shows one example in which a control part 232 determines that the host vehicle 10 is positioned in a blind area BA of an adjacent vehicle V1.
Figure 3B:
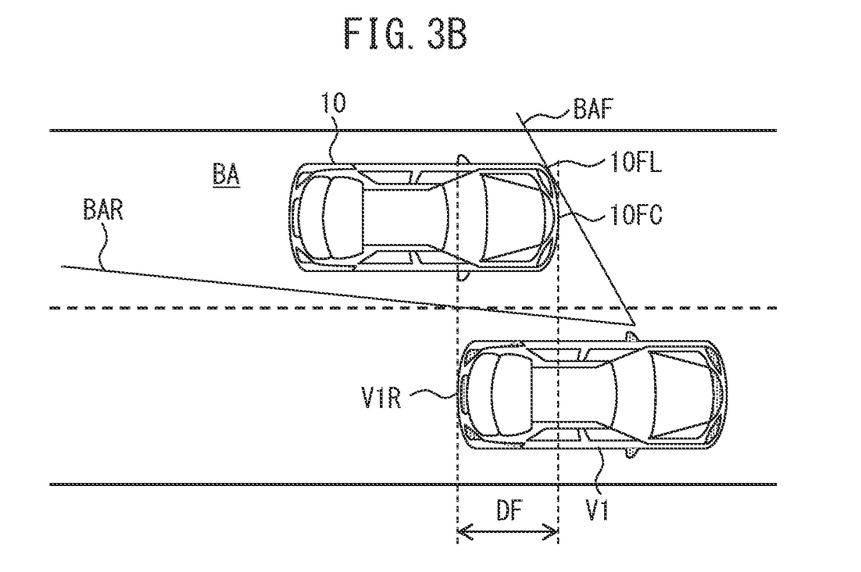
FIG. 3B shows another example in which the control part 232 determines that the host vehicle 10 is positioned in the blind area BA of the adjacent vehicle V1.

FIG. 3A and FIG. 3B show examples in which the control part 232 determines that the host vehicle 10 is positioned in the blind area BA of the adjacent vehicle V1. In more detail, FIG. 3A shows one example in which the control part 232 determines that the host vehicle 10 is positioned in the blind area BA of the adjacent vehicle V1. FIG. 3B shows another example in which the control part 232 determines that the host vehicle 10 is positioned in the blind area BA of the adjacent vehicle V1.

In the example shown in FIG. 3A, the front end center 10FC of the host vehicle 10 is positioned in the determination area AR (see FIG. 2), so the control part 232 determines that the host vehicle 10 is positioned in the blind area BA of the adjacent vehicle V1. In more detail, in the example shown in FIG. 3A, the front end center 10FC of the host vehicle 10 is positioned at the determination area rear end ARR (see FIG. 2), so a right rear end 10RR of the host vehicle 10 is positioned at a blind area rear end BAR of the adjacent vehicle V1.

In the example shown in FIG. 3B, the front end center 10FC of the host vehicle 10 is positioned in the determination area AR, so the control part 232 determines that the host vehicle 10 is positioned in the blind area BA of the adjacent vehicle V1. In more detail, in the example shown in FIG. 3B, the front end center 10FC of the host vehicle 10 is positioned at the determination area front end ARF (see FIG. 2), so a left front end 10FL of the host vehicle 10 is positioned at a blind area front end BAF of the adjacent vehicle V1.

In the example shown in FIG. 1, as conditions for the control part 232 performing the blind area avoidance control for making the host vehicle 10 avoid traveling in the blind area BA of the adjacent vehicle V1, the host vehicle 10 being positioned in the blind area BA of the adjacent vehicle V1 (first condition), a relative speed which is a value obtained by subtracting a speed of the host vehicle 10 from a speed of the adjacent vehicle V1 being larger than a first relative speed threshold value (for example, a negative value such as −2 km/h) (second condition), the relative speed being smaller than a second relative speed threshold value (for example, a positive value such as 2 km/h) (third condition), and an elapsed time from the point of time when the host vehicle 10 entered the blind area BA of the adjacent vehicle V1 being an elapsed time threshold value (for example 7 s) or more (fourth condition) are set.

The control part 232 performs the blind area avoidance control for making the host vehicle 10 avoid traveling in the blind area BA of the adjacent vehicle V1 when the first condition is satisfied, when the second condition is satisfied, when the third condition is satisfied, and when the fourth condition is satisfied.

On the other hand, the control part 232 does not perform the blind area avoidance control when the first condition is not satisfied (when the host vehicle 10 is not positioned in the blind area BA of the adjacent vehicle V1).

Further, the control part 232 also does not perform the blind area avoidance control when the second condition is not satisfied (when the relative speed which is the value obtained by subtracting the speed of the host vehicle 10 from the speed of the adjacent vehicle V1 is the first relative speed threshold value or less, in other words, when the host vehicle 10 is passing the adjacent vehicle V1). If for example control for making the host vehicle 10 decelerate as the blind area avoidance control is performed while the host vehicle 10 is passing the adjacent vehicle V1, the host vehicle 10 passing the adjacent vehicle V1 is obstructed and the driver of the host vehicle 10 is liable to feel impeded. Further, this is because if for example control for making the host vehicle 10 decelerate as the blind area avoidance control is performed while the host vehicle 10 is passing the adjacent vehicle V1, the time period when the host vehicle 10 is positioned in the blind area BA of the adjacent vehicle V1 becomes longer than a case in which the blind area avoidance control is not performed.

Further, the control part 232 also does not perform the blind area avoidance control when the third condition is not satisfied (when the relative speed which is the value obtained by subtracting the speed of the host vehicle 10 from the speed of the adjacent vehicle V1 is the second relative speed threshold value or more, in other words, when the adjacent vehicle V1 is passing the host vehicle 10). If for example control for making the host vehicle 10 decelerate and then making the host vehicle 10 accelerate to return the speed of the host vehicle 10 to the original speed as the blind area avoidance control is performed while the adjacent vehicle V1 is passing the host vehicle 10, the driver of the host vehicle 10 is liable to feel impeded (the driver of the host vehicle 10 is liable to feel that, for example, unnecessary control is performed).

Further, the control part 232 also does not perform the blind area avoidance control when the fourth condition is not satisfied (when the elapsed time from the point of time when the host vehicle 10 entered the blind area BA of the adjacent vehicle V1 is shorter than the elapsed time threshold value). This is because when the elapsed time from the point of time when the host vehicle 10 entered the blind area BA of the adjacent vehicle V1 is shorter than the elapsed time threshold value, the driver of the host vehicle 10 will probably not feel pressured. In other words, a case in which the fourth condition is not satisfied corresponds to a case in which the host vehicle 10 moves outside the blind area BA of the adjacent vehicle V1 before the driver of the host vehicle 10 feels pressured.

Figure 4:
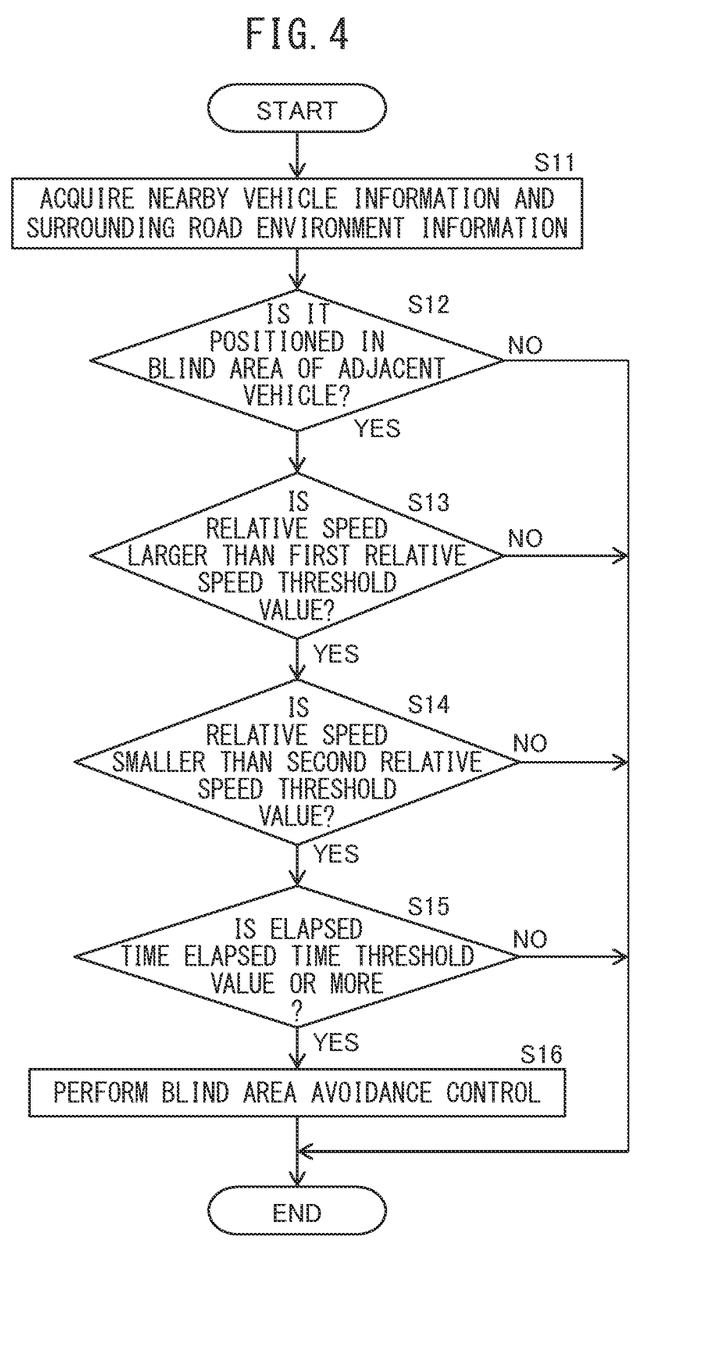
FIG. 4 is a flow chart for explaining one example of processing performed by a processor 23.

FIG. 4 is a flow chart for explaining one example of processing performed by the processor 23.

In the example shown in FIG. 4, at step S11, the acquisition part 231 acquires the nearby vehicle information and surrounding road environment information of the host vehicle 10.

At step S12, the control part 232 determines whether the host vehicle 10 is positioned in the blind area BA of the adjacent vehicle V1. When YES, the routine proceeds to step S13, while when NO, the control part 232 determines that there is no need to perform the blind area avoidance control for making the host vehicle 10 avoid traveling in the blind area BA of the adjacent vehicle V1 and the processing shown in FIG. 4 is ended.

At step S13, the control part 232 determines whether the relative speed which is the value obtained by subtracting the speed of the host vehicle 10 from the speed of the adjacent vehicle V1 is larger than the first relative speed threshold value. When YES, the routine proceeds to step S14, while when NO, the control part 232 determines that the host vehicle 10 is passing the adjacent vehicle V1 and there is no need for performing the blind area avoidance control and the processing shown in FIG. 4 is ended.

At step S14, the control part 232 determines whether the relative speed is smaller than the second relative speed threshold value. When YES, the routine proceeds to step S15, while when NO, the control part 232 determines that the adjacent vehicle V1 is passing the host vehicle 10 and there is no need for performing the blind area avoidance control and the processing shown in FIG. 4 is ended.

At step S15, the control part 232 determines whether the elapsed time from the point of time when the host vehicle 10 entered the blind area BA of the adjacent vehicle V1 is the elapsed time threshold value or more. When YES, the routine proceeds to step S16, while when NO, the control part 232 determines that there is no need for performing the blind area avoidance control and the processing shown in FIG. 4 is ended.

At step S16, the control part 232 performs the blind area avoidance control for making the host vehicle 10 avoid traveling in the blind area BA of the adjacent vehicle V1.

As explained above, in the host vehicle 10 to which the travel control device 12 of the first embodiment is applied, the control part 232 can perform the blind area avoidance control so as to make the host vehicle 10 avoid continuously traveling in the blind area BA of the adjacent vehicle V1 and can keep the driver of the host vehicle 10 from feeling pressured.

In more detail, in the host vehicle 10 to which the travel control device 12 of the first embodiment is applied, while the host vehicle 10 is passing the adjacent vehicle V1, the control part 232 determines that there is no need to perform the blind area avoidance control before the elapsed time from the point of time when the host vehicle 10 entered the blind area BA of the adjacent vehicle V1 becomes the elapsed time threshold value or more. Further, while the adjacent vehicle V1 is passing the host vehicle 10, the control part 232 determines that there is no need to perform the blind area avoidance control before the elapsed time from the point of time when the host vehicle 10 entered the blind area BA of the adjacent vehicle V1 becomes the elapsed time threshold value or more. In other words, in the host vehicle 10 to which the travel control device 12 of the first embodiment is applied, it is possible to determine early that there is no need to perform the blind area avoidance control.

Second Embodiment

The host vehicle 10 to which the travel control device 12 of the second embodiment is applied is configured in the same way as the host vehicle 10 to which the travel control device 12 of the first embodiment is applied except for the points explained below.

Figure 5A:
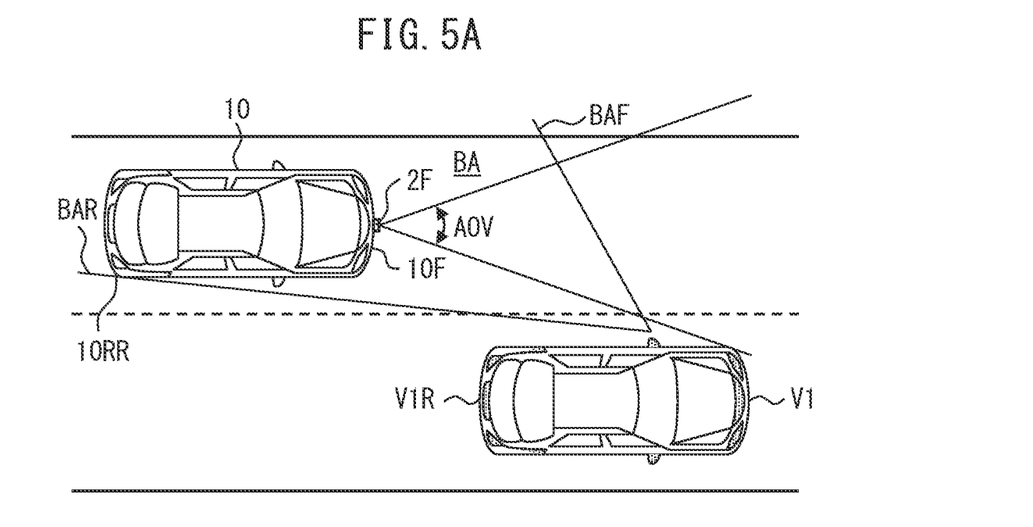
FIG. 5A shows an example in which a right rear end 10RR of the host vehicle 10 is positioned at a blind area rear end BAR of the adjacent vehicle V1 and the control part 232 of the travel control device 12 of a second embodiment determines that the host vehicle 10 is positioned in the blind area BA of the adjacent vehicle V1.
Figure 5B:
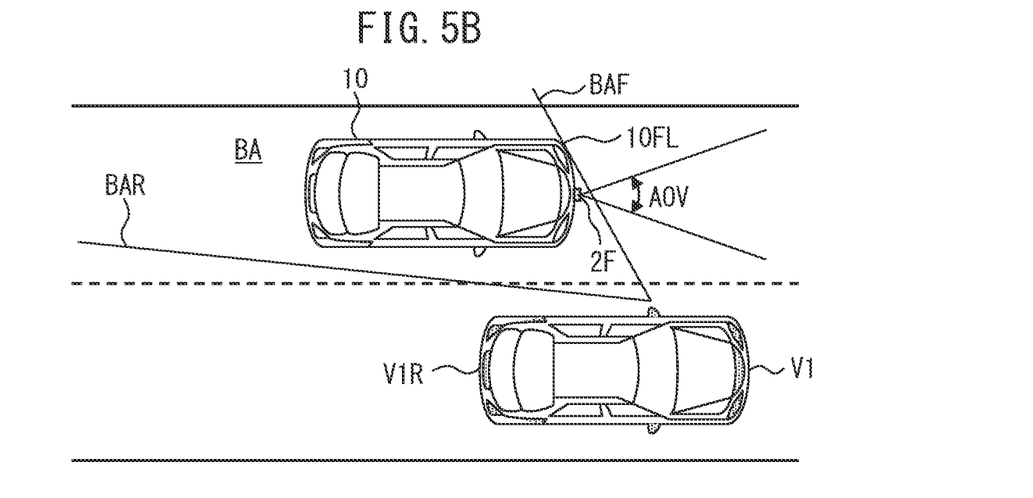
FIG. 5B shows an example in which a left front end 10FL of the host vehicle 10 is positioned at a blind area front end BAF of the adjacent vehicle V1 and the control part 232 of a travel control device 12 of the second embodiment determines that the host vehicle 10 is positioned in the blind area BA of the adjacent vehicle V1.

FIG. 5A and FIG. 5B are views showing examples in which the control part 232 of the travel control device 12 of the second embodiment determines that the host vehicle 10 is positioned in the blind area BA of the adjacent vehicle V1. In more detail, FIG. 5A shows an example in which the right rear end 10RR of the host vehicle 10 is positioned at the blind area rear end BAR of the adjacent vehicle V1 and the control part 232 of the travel control device 12 of the second embodiment determines that the host vehicle 10 is positioned in the blind area BA of the adjacent vehicle V1. FIG. 5B shows an example in which the left front end 10FL of the host vehicle 10 is positioned at the blind area front end BAF of the adjacent vehicle V1 and the control part 232 of the travel control device 12 of the second embodiment determines that the host vehicle 10 is positioned in the blind area BA of the adjacent vehicle V1.

In the example shown in FIG. 5A and FIG. 5B, the camera 2 provided at the host vehicle 10 include a front camera 2F. The front camera 2F captures an image of the front of the host vehicle 10 and sends the data of the image to the travel control device 12. The acquisition part 231 of the travel control device 12 acquires, as the nearby vehicle information, the data of the image of the front of the host vehicle 10 captured by the front camera 2F.

In the example shown in FIG. 5A and FIG. 5B, the angle of view AOV of the front camera 2F is set so that the host vehicle 10 is positioned outside the blind area BA of the adjacent vehicle V1 when the image of the front of the host vehicle 10 captured by the front camera 2F includes the adjacent vehicle V1, in other words, when at least part of the adjacent vehicle V1 is included in the angle of view AOV of the front camera 2F.

For this reason, in the examples shown in FIG. 5A and FIG. 5B, when the image of the front of the host vehicle 10 captured by the front camera 2F contains the adjacent vehicle V1, the control part 232 determines that the host vehicle 10 is not in the blind area BA of the adjacent vehicle V1.

As shown in FIG. 5A, when the host vehicle 10 approaches the adjacent vehicle V1 (in other words, the distance between the front end 10F of the host vehicle 10 and the rear end V1R of the adjacent vehicle V1 decreases), the image of the front of the host vehicle 10 captured by the front camera 2F no longer includes the adjacent vehicle V1 (in other words, the adjacent vehicle V1 is no longer included in the angle of view AOV of the front camera 2F).

Utilizing this property, the control part 232 determines that the host vehicle 10 is in the blind area BA of the adjacent vehicle V1 when the image of the front of the host vehicle 10 captured by the front camera 2F does not include the adjacent vehicle V1. In more detail, the control part 232 determines that the host vehicle 10 entered the blind area BA of the adjacent vehicle V1 when a state in which the image of the front of the host vehicle 10 captured by the front camera 2F includes the adjacent vehicle V1 shifts to a state in which the image of the front of the host vehicle 10 does not include the adjacent vehicle V1.

When the host vehicle 10 gets closer to the adjacent vehicle V1 than the state shown in FIG. 5A, the state shown in FIG. 5A shifts to the state shown in FIG. 5B. In the state shown in FIG. 5B as well, the adjacent vehicle V1 is not included in the image of the front of the host vehicle 10 captured by the front camera 2F (in other words, the adjacent vehicle V1 is not included in the angle of view AOV of the front camera 2F). For this reason, the control part 232 determines that the host vehicle 10 is in the blind area BA of the adjacent vehicle V1.

After the host vehicle 10 passes the adjacent vehicle V1, the host vehicle 10 is again positioned outside the blind area BA of the adjacent vehicle V1. In the host vehicle 10 to which the travel control device 12 of the second embodiment is applied, the control part 232 determines that the host vehicle 10 is not in the blind area BA of the adjacent vehicle V1 based on the nearby vehicle information obtained from something other than the front camera 2F among the camera 2, radar 3, and LiDAR 4 after the host vehicle 10 passes the adjacent vehicle V1.

Above, embodiments of the travel control device, travel control method, and non-transitory recording medium of the present disclosure were explained with reference to the drawings, but the travel control device, travel control method, and non-transitory recording medium of the present disclosure are not limited to the above embodiments and can be suitably changed within a scope not departing from the gist of the present disclosure. The configurations of the examples of the above embodiments may also be suitably combined.

In each example of the above embodiments, the processing performed in the travel control device 12 (autonomous control ECU) was explained as software processing performed by executing a computer program stored in the memory 22, but the processing performed by the travel control device 12 may also be processing performed by hardware. Alternatively, the processing performed in the travel control device 12 may be processing combining both software and hardware. Further, the program stored in the memory 22 of the travel control device 12 (program for realizing the function of the processor 23 of the travel control device 12), for example, may be recorded in a computer readable recording medium (non-transitory recording medium) such as a semiconductor memory, magnetic recording medium, optical recording medium, etc. and supplied, distributed, etc.

The invention claimed is:

1. A travel control device comprising a processor configured to:
   acquire nearby vehicle information and surrounding road environment information of a host vehicle; and
   perform blind area avoidance control making the host vehicle avoid traveling in a blind area of an adjacent vehicle which is traveling in a lane adjoining a lane in which the host vehicle is traveling based on the nearby vehicle information, wherein
   the processor
   performs the blind area avoidance control when the host vehicle is positioned in the blind area, a relative speed which is a value obtained by subtracting a speed of the host vehicle from a speed of the adjacent vehicle is larger than a first relative speed threshold value, the relative speed is smaller than a second relative speed threshold value, and an elapsed time from the point of time when the host vehicle entered the blind area is an elapsed time threshold value or more, and
   does not perform the blind area avoidance control when the host vehicle is not positioned in the blind area, when the relative speed is the first relative speed threshold value or less, when the relative speed is the second relative speed threshold value or more, or when the elapsed time is shorter than the elapsed time threshold value.

2. The travel control device according to claim 1, wherein the processor is configured to
   determine whether to perform the blind area avoidance control and
   calculate a degree of acceleration and deceleration of the host vehicle for performing the blind area avoidance control.

3. The travel control device according to claim 1, wherein the processor is configured to determine that the host vehicle is positioned in the blind area when a front end of the host vehicle is positioned in a determination area between a position a predetermined amount behind a rear end of the adjacent vehicle and a position a predetermined amount ahead of the rear end of the adjacent vehicle in a lane in which the host vehicle is traveling.

4. The travel control device according to claim 1, wherein the nearby vehicle information includes data of an image of the front of the host vehicle captured by a front camera installed in the host vehicle, and
   the processor is configured to
   determine that the host vehicle is not in the blind area when the image of the front of the host vehicle contains the adjacent vehicle, and
   determine that the host vehicle is in the blind area when the image of the front of the host vehicle does not contain the adjacent vehicle.

5. A travel control method comprising:
   acquiring nearby vehicle information and surrounding road environment information of a host vehicle; and
   performing blind area avoidance control making the host vehicle avoid traveling in a blind area of an adjacent vehicle which is traveling in a lane adjoining a lane in which the host vehicle is traveling based on the nearby vehicle information, wherein
   the blind area avoidance control is performed when the host vehicle is positioned in the blind area, a relative speed which is a value obtained by subtracting a speed of the host vehicle from a speed of the adjacent vehicle is larger than a first relative speed threshold value, the relative speed is smaller than a second relative speed threshold value, and an elapsed time from the point of time when the host vehicle entered the blind area is an elapsed time threshold value or more, and
   the blind area avoidance control is not performed when the host vehicle is not positioned in the blind area, when the relative speed is the first relative speed threshold value or less, when the relative speed is the second relative speed threshold value or more, or when the elapsed time is shorter than the elapsed time threshold value.

6. A non-transitory recording medium having recorded thereon a computer program for causing a processor to execute a process comprising:
   acquiring nearby vehicle information and surrounding road environment information of a host vehicle; and
   performing blind area avoidance control making the host vehicle avoid traveling in a blind area of an adjacent vehicle which is traveling in a lane adjoining a lane in which the host vehicle is traveling based on the nearby vehicle information, wherein
   the blind area avoidance control is performed when the host vehicle is positioned in the blind area, a relative speed which is a value obtained by subtracting a speed of the host vehicle from a speed of the adjacent vehicle is larger than a first relative speed threshold value, the relative speed is smaller than a second relative speed threshold value, and an elapsed time from the point of time when the host vehicle entered the blind area is an elapsed time threshold value or more, and
   the blind area avoidance control is not performed when the host vehicle is not positioned in the blind area, when the relative speed is the first relative speed threshold value or less, when the relative speed is the second relative speed threshold value or more, or when the elapsed time is shorter than the elapsed time threshold value.

* * * * *